(12) United States Patent
Jones et al.

(10) Patent No.: US 8,416,295 B2
(45) Date of Patent: Apr. 9, 2013

(54) SURVEILLANCE DATA RECORDING DEVICE AND METHOD

(75) Inventors: S. Bert Jones, Annapolis, MD (US); Gary R. Kenworthy, Calistoga, CA (US)

(73) Assignee: Triasys Technologies Corp., Billerica, MA (US)

( * ) Notice: Subject to any disclaimer, the term of this patent is extended or adjusted under 35 U.S.C. 154(b) by 1263 days.

(21) Appl. No.: 12/179,167

(22) Filed: Jul. 24, 2008

(65) Prior Publication Data

US 2010/0020171 A1   Jan. 28, 2010

(51) Int. Cl.
*H04N 7/18* (2006.01)

(52) U.S. Cl. ........ 348/143; 348/148; 348/149; 348/153; 348/159

(58) Field of Classification Search .................. 348/143, 348/148–149, 153, 159
See application file for complete search history.

(56) References Cited

U.S. PATENT DOCUMENTS

| | | | |
|---|---|---|---|
| 5,590,171 A | 12/1996 | Howe et al. | |
| 5,697,078 A | 12/1997 | Peterson et al. | |
| 5,890,056 A | 3/1999 | Garner et al. | |
| 5,913,161 A | 6/1999 | Ozulkulu et al. | |
| 6,072,860 A | 6/2000 | Kek et al. | |
| 6,226,498 B1 | 5/2001 | Tschorn et al. | |
| 6,229,887 B1 | 5/2001 | Albers et al. | |
| 6,233,313 B1 | 5/2001 | Farris et al. | |
| 6,606,494 B1 | 8/2003 | Arpee et al. | |
| 6,611,583 B1 | 8/2003 | Gainsboro | |
| 6,714,605 B2 | 3/2004 | Sugar et al. | |
| 6,751,297 B2 | 6/2004 | Nelkenbaum | |
| 6,754,311 B1 | 6/2004 | Kampmeier et al. | |
| 6,785,515 B1 | 8/2004 | Sommer et al. | |
| 6,891,267 B2 | 5/2005 | Asano et al. | |
| 7,055,174 B1 | 5/2006 | Cope et al. | |
| 7,142,108 B2 | 11/2006 | Diener et al. | |
| 2004/0109059 A1* | 6/2004 | Kawakita | 348/143 |
| 2004/0198282 A1* | 10/2004 | Heiderscheit et al. | 455/186.1 |
| 2005/0113049 A1* | 5/2005 | Takayama et al. | 455/150.1 |
| 2006/0146693 A1* | 7/2006 | Mori et al. | 370/208 |
| 2007/0052802 A1* | 3/2007 | Kasutani et al. | 348/143 |
| 2007/0107029 A1* | 5/2007 | Monroe et al. | 725/105 |
| 2007/0166003 A1* | 7/2007 | Herz et al. | 386/83 |
| 2007/0234394 A1* | 10/2007 | Skeie et al. | 725/120 |
| 2008/0063005 A1* | 3/2008 | Roos et al. | 370/432 |
| 2008/0309762 A1* | 12/2008 | Howard et al. | 348/148 |

* cited by examiner

*Primary Examiner* — Wing F Chan
*Assistant Examiner* — Benjamin M Thieu
(74) *Attorney, Agent, or Firm* — Peter A. Nieves; Sheehan Phinney Bass + Green PA

(57) ABSTRACT

A surveillance data recording device includes a display, a digital tuner, and a control mechanism. The display displays a received surveillance data signal over a first bandwidth. The control mechanism allows a user to select a frequency band of interest. The digital tuner truncates the received signal to produce a narrowband signal comprised only of portions of the received signal that are within the frequency band of interest. A digital storage unit, such as a fixed or removable hard drive or solid state storage device, stores the narrowband signal over a period of time.

17 Claims, 3 Drawing Sheets

SURVEILLANCE DATA RECORDING DEVICE AND METHOD

BACKGROUND

1. Technical Field

This document relates to data recording devices, and more specifically to devices configured to record a specific bandwidth of radio frequency.

2. Description of Related Prior Art

Existing surveillance data recorders have limited storage capability that can only be increased with bulky and expensive additional equipment. In addition, much of the limited storage of existing recorders is wasted on the storage of irrelevant data.

Similarly, typical existing surveillance data recorders use a large format recording medium, e.g., magnetic tape. In order to provide a recording medium capable of recording a substantial amount of time, large amounts of the recording medium must be used. This limits the amount of available space inside the recording device, resulting in additional components being required for operation. For example, an external digital tuner and/or computer for scanning and isolating a frequency bandwidth are required, resulting in an increase in physical size of a surveillance unit as well as the complexity of the unit, as additional connections must be made between the components. Additionally, with the use of a large format recording medium such as magnetic tape, the tape must be replace periodically, which may require a period of downtime for the surveillance unit.

The devices described in this document represent improvements that attempt to solve the problems presented by data recorders of the prior art.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a surveillance data recording device includes a display, a digital tuner, and a control mechanism. The display displays a received surveillance data signal over a first bandwidth, the control mechanism allows a user to select a frequency band of interest, and the digital tuner truncates the received signal to produce a narrowband signal comprised only of portions of the received signal that are within the frequency band of interest. A digital unit, such as a fixed or removable hard drive or solid state storage device, stores the narrowband signal over a period of time.

Optionally, the device may include a analog signal conditioner that filters interference from the narrowband signal. It also may include an integral global positioning system (GPS) receiver that generates GPS time codes and location codes. The digital storage unit stores the time codes and the location codes and in a manner that correlates the time codes and the location codes with the narrowband signal over the first period of time. Optionally, an internal clock may generate clock time codes, and the digital storage unit may store the clock time codes when global positioning system fails to generate an expected GPS time code signal, such as may occur due to a loss of GPS signal.

The device also may include a snapshot buffer that stores a representation of a wider bandwidth of the received signal over a brief period of time. The wider bandwidth is wider than that of the narrowband signal, such as at least ten times wider than a width of the frequency band of interest. The device also may include a sampling rate selector that allows a user to select a sampling rate for the stored representation of the second bandwidth of the surveillance data signal over the brief period of time.

Optionally, the device may be assigned a network address, and it may include a communications port that enables the unit to operate as a networked server in communication with other similar units.

Optionally, the device may include a user input device, such as a keypad, voice recorder, touch display or other device that enables the user to enter information during the first period of time. In such an embodiment, the digital storage device may store the narrowband signal on a first track and the user-entered information on a second track so that the user-entered information is correlated in time to the narrowband signal and the GPS time codes. The device also may include a playback selector that enables a user to select one of the tracks and a time point for playback of stored data.

BRIEF DESCRIPTION OF THE DRAWINGS

Aspects, features, benefits and advantages of the present invention will be apparent with regard to the following description and accompanying drawings, of which.

DETAILED DESCRIPTION

As used in this document, the term "surveillance data" is intended to refer to data received via an analog or digital signal that records activities of an event. Examples of possible types of surveillance data include audio or video recordings of rooms, buildings, vehicles or other locations; activity logs from telephones, personal digital assistants or other electronic communication devices; and vehicle on board diagnostic data such as airplane, automobile and other transport operating condition and maintenance data.

Figure 1:
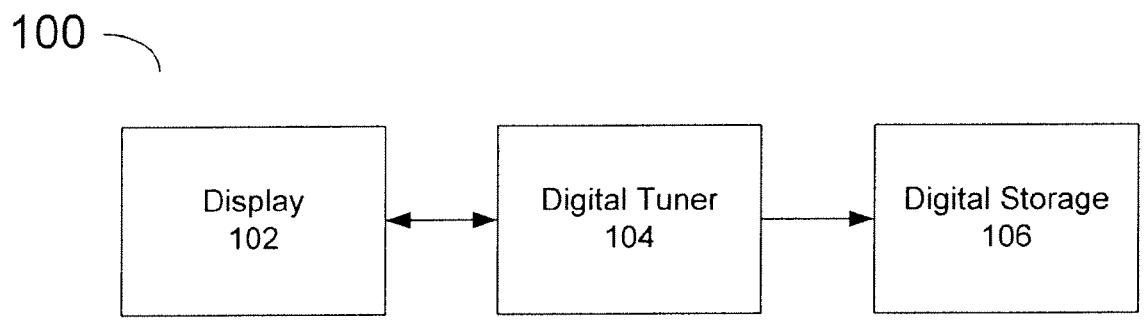
FIG. 1 illustrates various embodiments of a surveillance data recording device.

FIG. 1 illustrates one exemplary embodiment of a surveillance data recording device 100. In device 100, a display 102 displays a received surveillance data signal over a first bandwidth. In communication with the display 102 is digital tuner 104. Digital tuner 104 may include a control mechanism for selecting and isolating a frequency band of interest. A user may use a separate interface (such as a keypad), or the interface may be integrated into either the digital tuner 104 or the display 102 (e.g., a touch screen display). The user may select a frequency band of interest from the received surveillance data signal. The digital tuner 104 may then truncate the received surveillance data signal to produce a narrowband signal including only portions of the received surveillance data signal that fall within the frequency band of interest as selected by the user.

Once the digital tuner 104 produces the narrowband signal, the narrowband signal may be passed to digital storage 106. Digital storage 106 may be a disk based hard drive, a removable hard drive, or, in some instances, a solid state hard drive such as a flash memory. In certain situations, such as surveillance on a battlefield, a solid state device, with less moving components and thus less likelihood of failure, may be desirable.

A hard drive may also be selected based upon desired recording configurations. The size of the frequency band of interest (e.g., 4 MHz) may affect recording time as the larger the band, the more memory to store a second of the received surveillance data signal. For example, using conventional storage techniques, a 500 GB hard drive may record approximately twelve hours of data at 4 MHz. If twelve hours of recording time is not sufficient for a particular application, a larger hard drive or a smaller frequency band of interest may be used to increase recording time.

Figure 2:
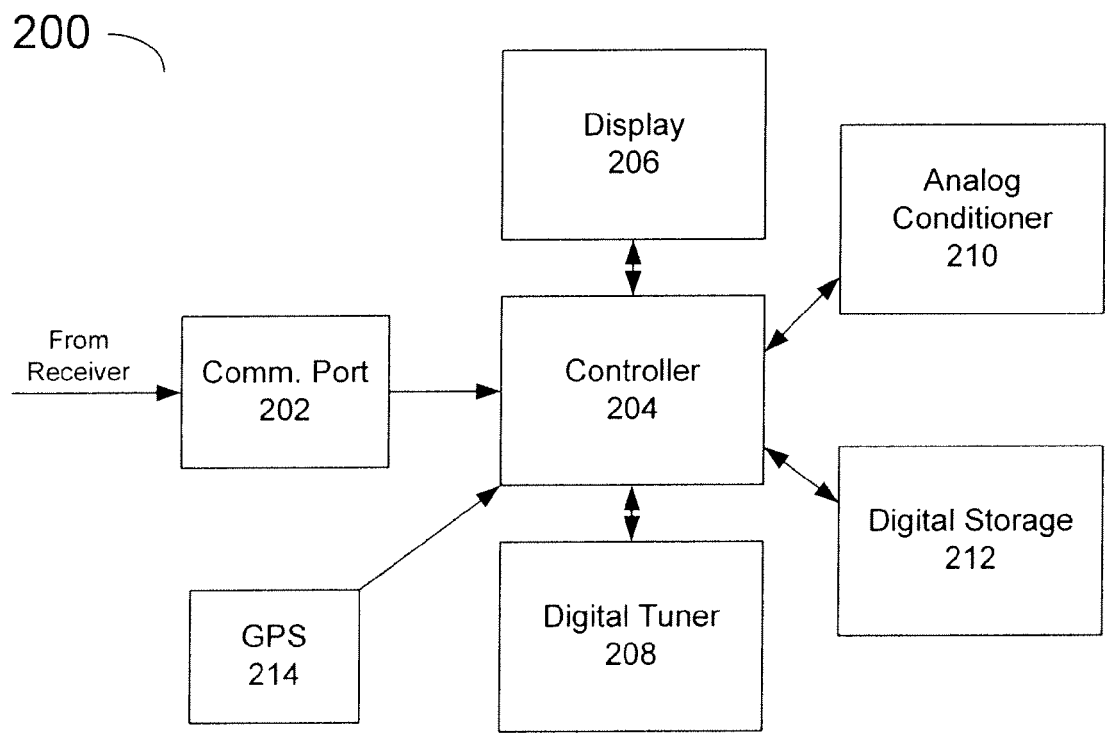
FIG. 2 illustrates various embodiments of a surveillance data recording device.

FIG. 2 illustrates one exemplary embodiment of a surveillance data recording device 200. In device 200, a communications port 202 receives a surveillance data signal from an external or integral receiver. The communications port passes this received data signal to controller 204. Controller 204 receives the surveillance data signal and displays the data signal on display 206. Display 206 displays a first bandwidth of the received surveillance data signal, indicating any activity over the displayed bandwidth.

Controller 204 also may communicate with a digital tuner 208. Similar to the discussion of FIG. 1, digital tuner 208 may allow a user to select a frequency band of interest from the received surveillance data signal. A user may use a separate interface (such as a keypad), or the interface may be integrated into either the digital tuner 208 or the display 204 (e.g., a touch screen display) to select a frequency band of interest from the received surveillance data signal. The digital tuner 208 may then truncate the received surveillance data signal to produce a narrowband signal. The narrowband signal may include only portions of the received surveillance data signal that fall within the user selected frequency band of interest.

Controller 204 may then pass the narrowband signal to an analog conditioner 210. Here, the narrowband signal (previously converted from a digital signal to an analog signal at a converter not shown in FIG. 2 but discussed in FIG. 3) is conditioned such that any interference is removed from the narrowband signal, producing a cleaner signal for further analysis. After conditioning, the narrowband signal may be transferred by controller 204 to digital storage 212.

Controller 204 may also be in communication with a global positioning system receiver (GPS) 214. GPS 214 may be configured to generate time and location codes for the received surveillance data signal. These time and location codes may then be stored with the narrowband signal in digital storage 212, correlating the time and location to the narrowband signal in one or more tracks. Similarly, a track may be added to any stored signal indicating any user entered information, such as the user's frequency band of interest, as well as any other user entered information.

Figure 3:
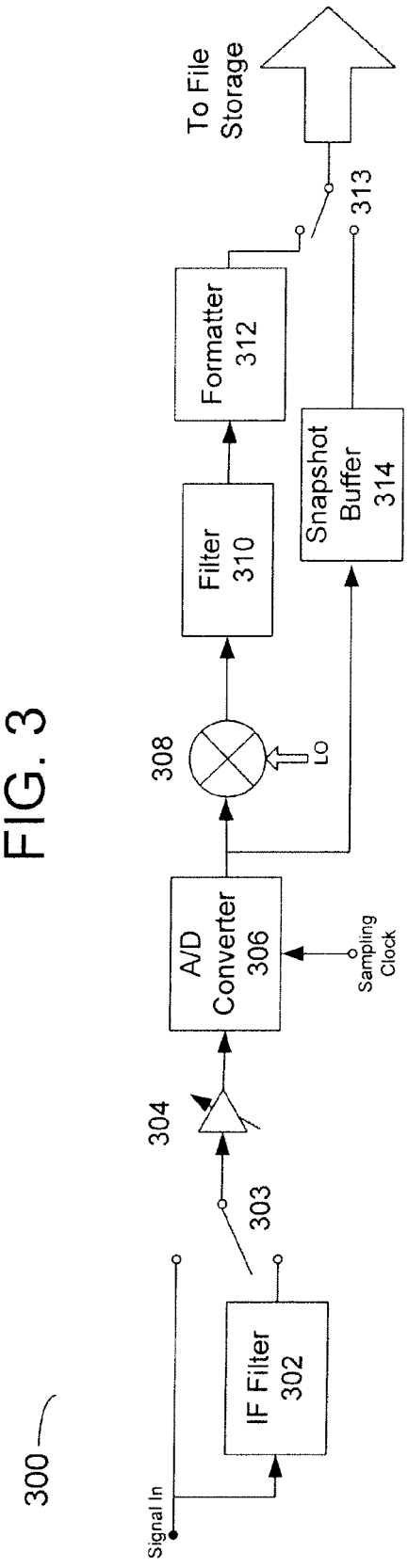
FIG. 3 illustrates various embodiments of a recording circuit path of a surveillance data recording device.
Figure 4:
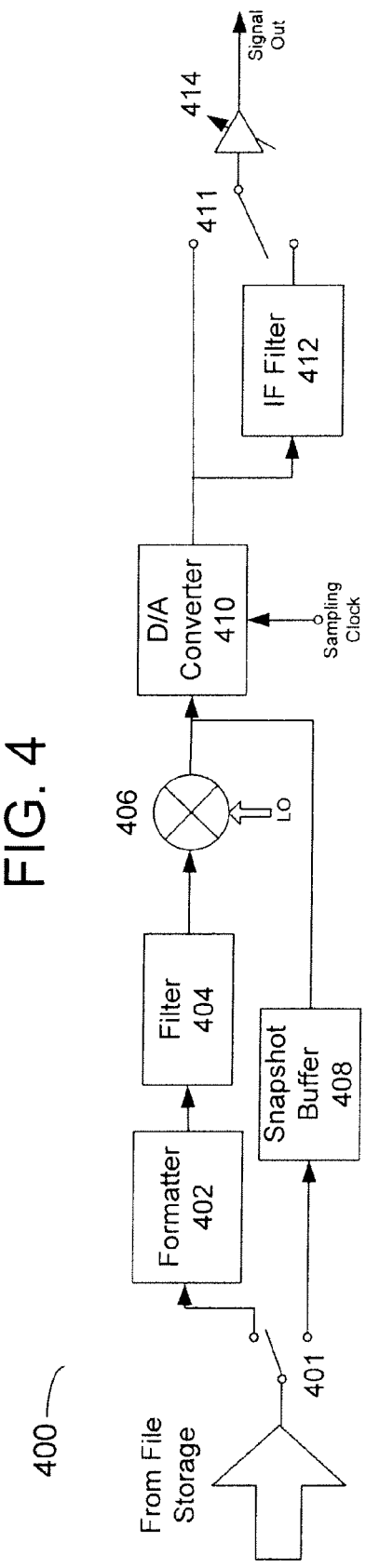
FIG. 4 illustrates various embodiments of a playback circuit path of a surveillance data recording device.

While FIGS. 1 and 2 illustrate exemplary surveillance data recording devices 100 and 200, FIGS. 3 and 4 expand upon these embodiments to illustrate more detailed circuits for both record and playback paths that may be applied to either device discussed above.

FIG. 3 illustrates a recording circuit path 300 of a surveillance data recording device (e.g., device 100 or 200). Here, the received surveillance data signal enters from the left. Depending on a selected level of filtering, switch 303 may be in the up or down position. If the switch is in the up position (as illustrated by FIG. 3), the received surveillance data signal may bypass intermediate frequency (IF) filter 302 and may pass directly to amplifier 304. However, if switch 303 is in the down position, the received surveillance data signal may pass through IF filter 302 where additional filtering may be performed.

Once past switch 303, the received surveillance data signal is amplified at amplifier 304 before being converted from an analog signal to a digital signal at A/D converter 306. After conversion, the received surveillance data signal may follow one of two paths, a top path having mixer 308, filter 310 and formatter 312, or a bottom path having a snapshot buffer 314. The path chosen is dependent on a user inputted choice, which determines the position of switch 313. If a user chooses to record a smaller frequency band (as compared to the frequency band of the received surveillance data signal) over a first period of time, switch 313 may be in the up position, and the received surveillance data signal may follow the top path. If the user chooses to record a much larger frequency band (e.g., at least ten times larger than the smaller frequency band) for a second period of time, the switch 313 may be in the lower position, and the received surveillance data signal may follow the bottom path.

In the instance when the switch 313 is in the up position, received surveillance data signal may follow the top path. First, the received surveillance data signal is processed at mixer 308. Here, mixer 308 processes the received surveillance data signal in coordination with the output of a local oscillator (LO) to produce multiple signals, each at a different frequency band. The multiple signals may then be passed to filter 310. Here, the desired frequency band of interest as selected by the user is isolated, and a narrowband signal is produced. The narrowband signal may contain only portions of the received surveillance data signal that are within the frequency band of interest selected by the user. After isolating the narrowband signal, the narrowband signal is further processed at formatter 312 to format the narrowband signal for storage.

In the instance when the switch 313 is in the down position, received surveillance data signal may follow the bottom path. First, the received surveillance data signal is processed at snapshot buffer 314. Snapshot buffer 314 is configured to store a representation of a second frequency band of interest of the received surveillance data signal over a second period of time. As the second frequency band of interest may generally be much larger (e.g., at least ten times larger) than the first frequency band of interest discussed above, the second period of time may generally be much smaller than the first period of recording time associated with the first frequency band of interest. The snapshot buffer 314 may be used when a user wants a short-term view of the entire received frequency spectrum. This may be used to identify multiple frequency bands of interest for more detailed recording over an extended period of time.

FIG. 4 illustrates a playback circuit path 400 of a surveillance data recording device (e.g., device 100 or 200). In this example, playback circuit path 400 is basically a mirrored circuit to the record circuit path 300 discussed above. Here, the stored signal is loaded from file storage and enters playback circuit 400 from the left. Depending upon how the stored signal was recorded, multiple paths may be taken during playback. If a smaller frequency band was selected, and a recording over a longer period of time was stored, the switch 401 may be in the up position and the narrowband signal may follow the top path through formatter 402, filter 404 and mixer 406. If the stored narrowband signal is a larger frequency, shorter time period snapshot, switch 401 may be in the down position and the stored narrowband frequency may follow the bottom path through snapshot buffer 408. After following either the top or bottom path, the stored signal reaches D/A converter 410. At D/A converter 410, the stored signal is converted from digital to analog for playback. Then, depending on the level of desired filtering, the signal is either further filtered by IF filter 412 or passed directly to amplifier 414 for outputting. Switch 411 is controlled based upon the desired level of filtering, and establishes a path either directly from D/A converter 410 to amplifier 414, or a path through IF filter 412 to amplifier 414.

Figure 5:
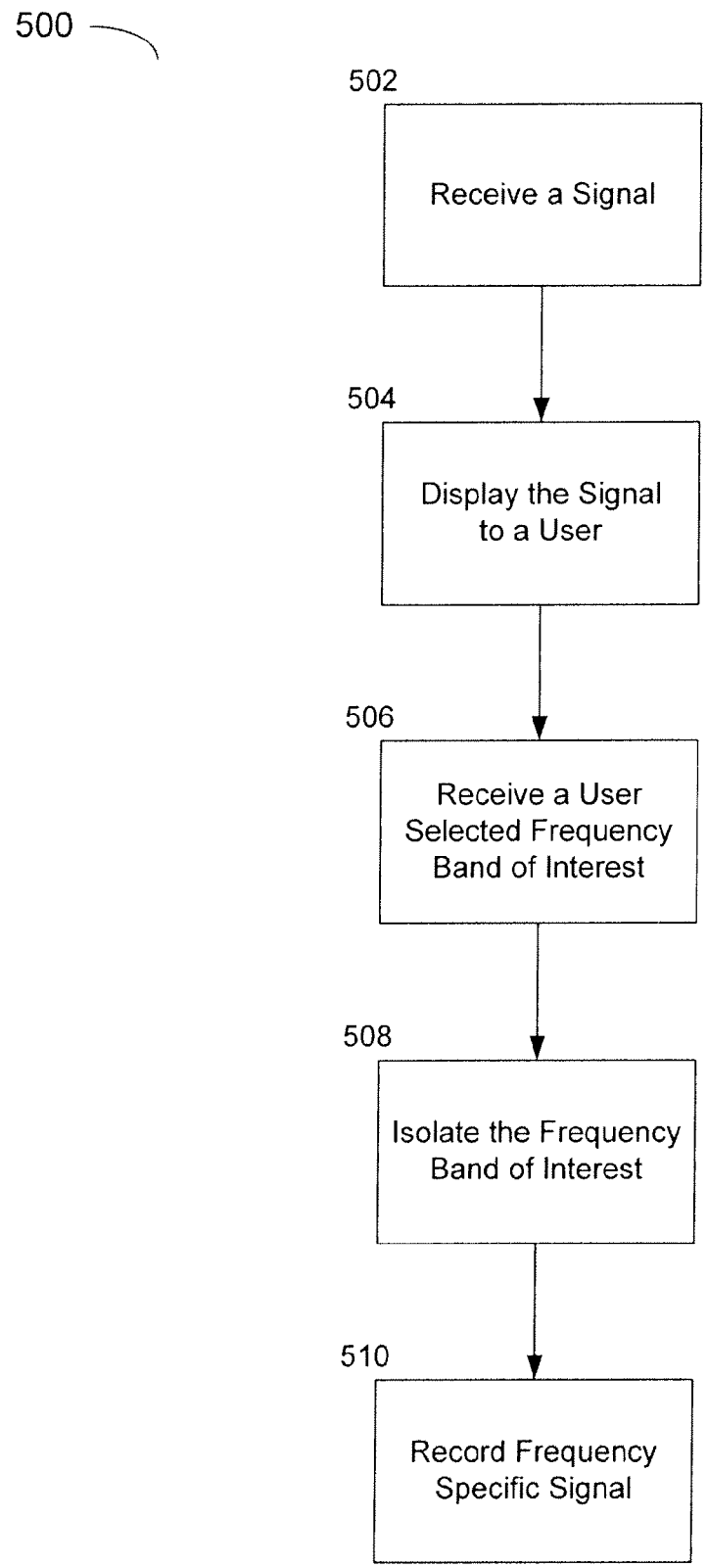
FIG. 5 illustrates various embodiments of an isolation and recording method.

FIG. 5 illustrates an exemplary process 500 of an isolation and recording method. The process begins when a surveillance data recording device receives 502 a signal over a radio frequency (RF) spectrum. Next, the signal may be displayed 504 to a user, showing an activity over the received 502 RF spectrum. After displaying 504, the user may select 506 a frequency band of interest from the received 502 signal. The user may analyze the displayed 504 signal, locate any areas of specific activity, and select 506 the frequency bands having activity, or merely select any frequency band in the received 502 signal regardless of present activity. Next, the user selected 506 frequency band of interest is isolated 508 to produce a frequency specific signal. The frequency specific signal is a narrowband signal containing only portions of the received 502 signal present in the user selected 506 frequency band of interest. After isolating 508 the frequency band of interest, the frequency specific signal is recorded 510 on a digital storage medium.

It should be noted that additional components may be included in the above discussed circuits, and the above discussion are provided only as exemplary embodiments. For example, an additional communications port may be included in the surveillance data recording devices discussed above. Each device may be assigned a unique network address, and the additional communications port may be used to connect the device to a communications network. The device may then function as a server, allowing remote units to access any stored information.

Similarly, the surveillance data recording devices may include a sampling rate selector. The sampling rate selector may allow a user to select a sampling rate at which a stored signal will be processed at. For example, in the example where a user selects a second bandwidth for processing and storage by the snapshot buffer, the user may select a sampling rate for the stored information over a period of time.

Yet another additional component may be an internal clock. The internal clock may be configured to generate a clock time code. Similar to the time codes produces by the GPS unit, the internal clock time codes may be used as a back-up feature to the GPS should the GPS fail.

Various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A surveillance data recording device, comprising:
   a display configured to display a received surveillance data signal over a first bandwidth;
   a digital tuner and control mechanism, wherein the control mechanism is configured to select a frequency band of interest, and the digital tuner truncates the received signal to produce a narrowband signal comprising portions of the received signal within the frequency band of interest; and
   a digital storage unit that stores the narrowband signal over a first period of time.

2. The device of claim 1, further comprising: an analog signal conditioner that filters interference from the narrowband signal.

3. The device of claim 1, further comprising:
   an integral global positioning system receiver that generates time codes and location codes;
   wherein the digital storage unit stores the time codes and the location codes and in a manner that correlates the time codes and the location codes with the narrowband signal over the first period of time.

4. The device of claim 1, further comprising:
   a snapshot buffer that stores a representation of a second bandwidth of the received signal over a second period of time, wherein the second bandwidth is at least ten times wider than a width of the frequency band of interest.

5. The device of claim 1, further comprising:
   an assigned network address; and
   a communications port that enables the unit to operate as a networked server in communication with other similar units.

6. The device of claim 1, wherein the digital storage unit comprises a removable hard drive or solid state storage device.

7. A surveillance data recording device, comprising:
   a communications port that obtains a surveillance data signal from an external receiver;
   a display configured to display a first bandwidth of the surveillance data signal;
   a digital tuner configured to select a frequency band of interest and truncate the surveillance data signal to produce a narrowband signal comprising portions of the received signal within the frequency band of interest;
   an analog signal conditioner configured to filter interference from the narrowband signal;
   an integral global positioning system receiver configured to generate GPS time codes and location codes; and
   a digital storage unit that stores the narrowband signal, the GPS time codes and the location codes over the first period of time.

8. The device of claim 7, further comprising:
   a snapshot buffer that stores a representation of a second bandwidth of the surveillance data signal over a second period of time, wherein the second bandwidth is of a narrower width than a width of the frequency band of interest.

9. The device of claim 8, further comprising a sampling rate selector that allows a user to select a sampling rate for the stored representation of the second bandwidth of the surveillance data signal over a second period of time.

10. The device of claim 7, further comprising an internal clock, wherein the clock generates clock time codes, and the digital storage unit stores the clock time codes if the global positioning system receiver fails to generate an expected GPS time code signal.

11. The device of claim 7, further comprising:
a user input device that enables the user to enter information during the first period of time;
wherein the digital storage device stores the narrowband signal on a first track, and the digital storage device also stores the user-entered information on a second track so that the user-entered information is correlated in time to the narrowband signal and the GPS time codes.

12. The device of claim 11, further comprising a playback selector that enables a user to select one of the tracks and a time point for playback of stored data.

13. A method of isolating and recording a signal, the method comprising the steps of:
receiving a signal over a radio frequency spectrum;
displaying the signal over the radio frequency spectrum;
receiving a user selection of a frequency band of interest;
isolating the frequency band of interest from the received radio frequency spectrum to produce a narrowband frequency specific signal; and
recording the narrowband frequency specific signal on a digital storage device thereby producing a recorded data signal representing any activity on said isolated frequency band over a first period of time.

14. The method of claim 13, further comprising the step of recording time codes and location codes associated with the narrowband frequency specific signal.

15. The method of claim 14, wherein the time codes and location codes are generated by a global position service receiver.

16. The method of claim 13, further comprising the step of storing a representation of the received radio frequency spectrum in a snapshot buffer over a second period of time.

17. The method of claim 16, wherein the second period of time is significantly shorter than the first period of time.

* * * * *